(12) United States Patent
Bharucha et al.

(10) Patent No.: US 11,465,761 B2
(45) Date of Patent: Oct. 11, 2022

(54) NECK PROTECTION SYSTEM FOR PARACHUTE ASSEMBLIES

(71) Applicant: AMI Industries, Inc., Colorado Springs, CO (US)

(72) Inventors: Nicholas K Bharucha, Colorado Springs, CO (US); Casey Andrew Stribrny, Colorado Springs, CO (US); Steve Holstine, Colorado Springs, CO (US); Ian Walter Haas, Colorado Springs, CO (US); Dirk Albert Roberts, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 30 days.

(21) Appl. No.: 17/032,504

(22) Filed: Sep. 25, 2020

(65) Prior Publication Data

US 2022/0097854 A1    Mar. 31, 2022

(51) Int. Cl.
*B64D 25/06* (2006.01)
*B64D 25/10* (2006.01)

(52) U.S. Cl.
CPC ............. *B64D 25/06* (2013.01); *B64D 25/10* (2013.01)

(58) Field of Classification Search
CPC ........ B64D 25/10; B64D 25/00; B64D 25/02; B64D 25/06; B64D 25/08; B64D 25/12; B64D 25/14; B64D 11/0616; B64D 17/00; B64D 17/02; B64D 17/22; B64D 17/24; B64D 17/30; B64D 17/32; B64D 17/62; A62B 35/00; A62B 35/0006; A62B 35/0012; A62B 35/0018; A62B 35/0025; B60R 22/12; B60R 22/14
See application file for complete search history.

(56) References Cited

U.S. PATENT DOCUMENTS

| | | | |
|---|---|---|---|
| 1,640,270 | A | 8/1927 | Furman |
| 2,708,083 | A | 5/1955 | Martin |
| 3,372,893 | A | 3/1968 | Larsen |
| 3,498,565 | A | 3/1970 | Stephens |
| 3,768,761 | A | 10/1973 | Cramer |

(Continued)

FOREIGN PATENT DOCUMENTS

| | | |
|---|---|---|
| DE | 4334743 | 10/1994 |
| EP | 3156332 | 4/2017 |

(Continued)

OTHER PUBLICATIONS

USPTO, Pre-Interview First Office Action dated Sep. 14, 2020 in U.S. Appl. No. 16/138,415.

(Continued)

*Primary Examiner* — Joshua J Michener
*Assistant Examiner* — Ryan Andrew Yankey
(74) *Attorney, Agent, or Firm* — Snell & Wilmer L.L.P.

(57) ABSTRACT

A neck protection system for a parachute assembly may comprise a head restraint, a first upper strap coupled to a first side of the head restraint, and a second upper strap coupled to a second, opposing side the head restraint. A first lower strap may be coupled to the first side of the head restraint. A second lower strap may be coupled to the second side of the head restraint. A first pull cord may be coupled to the first upper strap. A second pull cord may be coupled to the second upper strap.

15 Claims, 5 Drawing Sheets

(56) References Cited

U.S. PATENT DOCUMENTS

| | | | |
|---|---|---|---|
| 3,841,590 A | | 10/1974 | Valentine |
| 3,921,944 A | | 11/1975 | Morrison |
| 4,399,969 A | | 8/1983 | Gargano |
| 4,466,662 A | | 8/1984 | McDonald |
| 4,637,577 A | | 1/1987 | Miseyko |
| 4,687,160 A | * | 8/1987 | Logemann ............ B64D 17/24 244/142 |
| 4,850,554 A | * | 7/1989 | Strong ................. B64D 17/30 244/151 R |
| 4,923,147 A | | 5/1990 | Adams et al. |
| 5,039,035 A | | 8/1991 | Fitzpatrick |
| 5,301,903 A | | 4/1994 | Aronne |
| 6,708,927 B2 | | 3/2004 | Chen |
| 7,703,152 B2 | | 4/2010 | Rhodes et al. |
| 9,038,948 B2 | | 5/2015 | Ruff et al. |
| 9,924,755 B2 | | 3/2018 | Margetis |
| 11,305,880 B2 | * | 4/2022 | Holstine ............ B64D 11/062 |
| 11,338,925 B2 | * | 5/2022 | Bharucha ............ B64D 25/10 |
| 11,345,458 B2 | * | 5/2022 | Holstine ............ B64D 25/10 |
| 11,358,728 B2 | * | 6/2022 | Bharucha ............ B64D 25/04 |
| 2004/0182644 A1 | | 9/2004 | Kotarski |
| 2012/0012421 A1 | * | 1/2012 | Morgan ............ A62B 35/0018 182/3 |
| 2013/0092796 A1 | | 4/2013 | Weinel |
| 2017/0106987 A1 | * | 4/2017 | Adams ................. B64D 17/00 |
| 2017/0349292 A1 | * | 12/2017 | Adams ................. B64D 25/10 |
| 2020/0094972 A1 | * | 3/2020 | Volny .................. B64D 17/24 |
| 2020/0094973 A1 | * | 3/2020 | Volny .................. B64D 17/30 |
| 2020/0094974 A1 | * | 3/2020 | Volny .................. B64D 25/02 |
| 2020/0094975 A1 | * | 3/2020 | Volny .................. B64D 17/30 |

FOREIGN PATENT DOCUMENTS

| | | | | |
|---|---|---|---|---|
| FR | 2750395 | | 10/1998 | |
| GB | 1379784 | | 1/1975 | |
| GB | 1570283 A | * | 6/1980 | ............ B64D 25/02 |
| RU | 2621133 | | 5/2017 | |
| RU | 2624122 | | 6/2017 | |

OTHER PUBLICATIONS

USPTO, Notice of Allowance dated Feb. 8, 2021 in U.S. Appl. No. 16/138,014.

USPTO, Notice of Allowance dated Feb. 22, 2021 in U.S. Appl. No. 16/138,216.

USPTO, Notice of Allowance dated Feb. 24, 2021 in U.S. Appl. No. 16/138,336.

USPTO, Pre-Interview First Office Action dated Dec. 22, 2020 in U.S. Appl. No. 16/138,216.

USPTO, Pre-Interview First Office Action dated Dec. 21, 2020 in U.S. Appl. No. 16/138,336.

USPTO, Pre-Interview First Office Action dated Oct. 30, 2020 in U.S. Appl. No. 16/138,014.

USPTO, Notice of Allowance dated Nov. 12, 2020 in U.S. Appl. No. 16/138,415.

United Kingdom Intellectual Property Office; United Kingdom Search Report dated Apr. 29, 2022 in Application No. GB2113764.1.

* cited by examiner

NECK PROTECTION SYSTEM FOR PARACHUTE ASSEMBLIES

FIELD

The present disclosure relates to parachutes, and more specifically, to parachute assemblies having a neck protection system on the parachute and methods of assembling the same.

BACKGROUND

Ejection seats are designed to eject pilots from an aircraft, with the pilot oriented in a generally upright, sitting position. Conventionally, the pilot is released from the ejection seat in response to deployment the ejection seat's main parachute assembly. As the canopy of the parachute assembly catches wind, the pilot may be rotated to orient the pilot in the direction of canopy line stretch. As the pilot is suddenly oriented in-line with the force provided by the canopy, there is an increased risk of neck hyperextension and injury due to the change in orientation forcing the pilot's head rearward.

SUMMARY

A neck protection system for parachute assembly is disclosed herein. In accordance with various embodiments, the neck protection system may comprise a head restraint, a first upper strap coupled to a first side of the head restraint, and a second upper strap coupled to a second side the head restraint. The second side may be opposite the first side. A first lower strap may be coupled to the first side of the head restraint. A second lower strap may be coupled to the second side of the head restraint. A first pull cord may be coupled to the first upper strap. A second pull cord may be coupled to the second upper strap.

In various embodiments, a first releasable restraint may be coupled to the first lower strap. A second releasable restraint may be coupled to the second lower strap. In various embodiments, the first lower strap, the first upper strap, the second lower strap, and the second upper strap may each form a loop configured to receive a riser of the parachute assembly.

In various embodiments, the head restraint may comprise at least one of a net or a mesh. In various embodiments, a distance between the first upper strap and the first lower strap may be configured to increase in response to deployment of the parachute assembly.

In various embodiments, the head restraint may comprise an elastic material. In various embodiments, the distance between the first upper strap and the first lower strap may be configured to decrease in response to a separation of the first releasable restraint.

A parachute assembly is also disclosed herein. In accordance with various embodiments, the parachute assembly may comprise a first riser, a second riser, and a neck protection system coupled to the first riser and the second riser. The neck protection system may include a head restraint, a first upper strap coupled to the head restraint and the first riser, a second upper strap coupled to the head restraint and the second riser, a first lower strap coupled to the head restraint and the first riser, a second lower strap coupled to the head restraint and the second riser, a first pull cord coupled to the first upper strap and the first riser, and a second pull cord coupled to the second upper strap and the second riser.

In various embodiments, the neck protection system may further comprise a first releasable restraint coupled to the first lower strap and the first riser, and a second releasable restraint coupled to the second lower strap and the second riser. In various embodiments, a canopy may be coupled to the first riser and the second riser. The first upper strap may be located closer to the canopy as compared to the first lower strap.

In various embodiments, the first riser may be located through the first lower strap and the first upper strap. The second riser may be located through the second lower strap and the second upper strap. In various embodiments, a distance between the first upper strap and the first lower strap may be configured to increase in response to deployment of the parachute assembly.

In various embodiments, the head restraint may comprise an elastic material. In various embodiments, the distance between the first upper strap and the first lower strap may be configured to decrease in response to a separation of the first releasable restraint.

In various embodiments, the first releasable restraint may comprise at least one of a frangible thread or hook and loop fasteners. In various embodiments, the first pull cord may be coupled to the first upper strap and a first attachment point on the first riser. The first attachment point may be configured to translate away from the first lower strap in response to deployment of the parachute assembly.

In various embodiments, the second pull cord may be coupled to the second upper strap and a second attachment point on the second riser. The second attachment point may be configured to translate away from the second lower strap in response to deployment of the parachute assembly.

A method of assembling a parachute assembly is also disclosed herein. In accordance with various embodiments, the method may comprise the steps of coupling a first upper strap to a first riser and a head restraint, coupling a second upper strap to a second riser and the head restraint, and coupling a first lower strap to the first riser and the head restraint, coupling a second lower strap to the second riser and the head restraint. The method may further include the steps of coupling a first pull cord to the first upper strap and a first attachment point on the first riser and coupling a second pull cord to the second upper strap and a second attachment point on the second riser. The first attachment point may be configured to translate away from the first lower strap in response to deployment of the parachute assembly. The second attachment point may be configured to translate away from the second lower strap in response to deployment of the parachute assembly.

In various embodiments, the step of coupling the first lower strap to the first riser and the head restraint may comprise attaching a releasable restraint to the first lower strap and the first riser. In various embodiments, the head restraint may comprise an elastic material, and a distance between the first upper strap and the first lower strap may be configured to decrease in response to separation of the releasable restraint.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
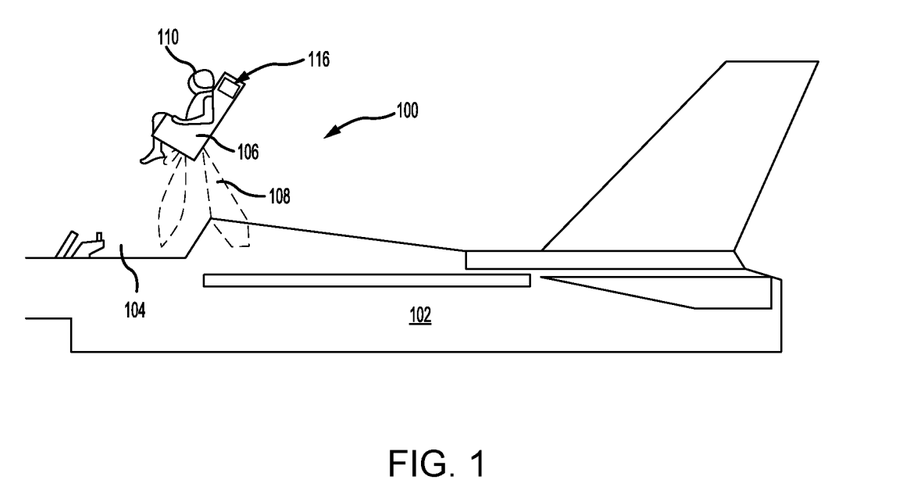
FIG. 1 illustrates an ejection seat being launched from an aircraft cockpit, in accordance with various embodiments.

With reference to FIG. 1, an aircraft ejection system 100 is shown. In accordance with various embodiments, aircraft ejection system 100 may be installed in an aircraft 102 to safely expel an ejection seat 106 and an occupant 110 of ejection seat 106 from a cockpit 104 of aircraft 102. Ejection seat 106 may be urged from cockpit 104 by a propulsion system 108. Aircraft ejection system 100 may include a parachute assembly 116. In various embodiments, prior to deployment of parachute assembly 116, a portion of parachute assembly 116 may be stored within ejection seat 106.

Figure 2:
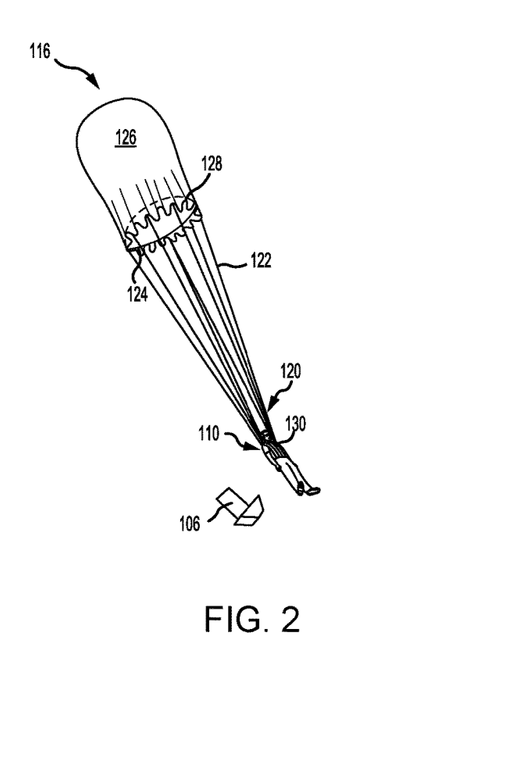
FIG. 2 illustrates a parachute assembly in a deployed state after separation of the occupant from the ejection seat, in accordance with various embodiments.

With reference to FIG. 2, parachute assembly 116 is illustrated in a deployed state. In accordance with various embodiments, parachute assembly 116 may be used to increase a drag of, or otherwise decelerate, occupant 110, in response to occupant 110 being ejected, jumped, ditched, and/or dropped (collectively, "ejected") from an aircraft. Parachute assembly 116 may be configured to deploy upon separation of occupant 110 from ejection seat 106. Stated differently, in various embodiments, deployment of parachute assembly 116 may be configured to separate occupant 110 from ejection seat 106. Parachute assembly 116 may comprise a canopy 126, suspension lines 122, and risers 120.

Upon deployment of parachute assembly 116, canopy 126 may open to increase drag, or otherwise decelerate, occupant 110. Canopy 126 may comprise any suitable type of canopy and any suitable type of material, such as, for example, canvas, silk, nylon, aramid fiber (e.g., KEVLAR®), polyethylene terephthalate, and/or the like. Suspension lines 122 may be coupled to canopy 126 using any suitable attachment technique, such as, for example, through stitching. Suspension lines 122 may be configured to at least partially stabilize deployed canopy 126. In various embodiments, parachute assembly 116 may include one or more reefing line(s) 124. Reefing line 124 may be coupled to canopy 126 proximate a circumferential edge 128 of canopy 126. Reefing line 124 may also be coupled to suspension lines 122. Reefing line 124 is configured to restrict expansion of canopy 126 such that canopy 126 opens in stages. For example, reefing line 124 may be cut, or otherwise severed, at a preselected time after deployment of canopy 126. Prior to cutting reefing line 124, canopy 126 is held at a first, restricted diameter. After reefing line 124 is severed, canopy 126 is able to open further and its diameter increases. Opening canopy 126 in stages may reduce opening shock to parachute assembly 116. The time delay between deploying canopy 126 and severing reefing line 124 may comprise any suitable time delay based on properties of parachute assembly 116, the type of aircraft, and/or the load limitations of the object (e.g., occupant 110) being carried by parachute assembly 116.

In various embodiments, suspension lines 122 may be configured to connect canopy 126 to risers 120. Suspension lines 122 and risers 120 may comprise any suitable material. For example, suspension lines 122 may comprise a tubular braided material that constricts in diameter under tension, such as, for example, nylon, aramid fiber (e.g., KEVLAR®), and/or the like. Risers 120 may comprise a webbing formed from nylon, aramid fiber (e.g., KEVLAR®), and/or the like. Risers 120 may be configured to attach to a harness 130, or other structure, configured to secure occupant 110 to risers 120. In various embodiments, parachute assembly 116 may comprise a plurality of risers 120 attached to harness 130.

Figure 3:
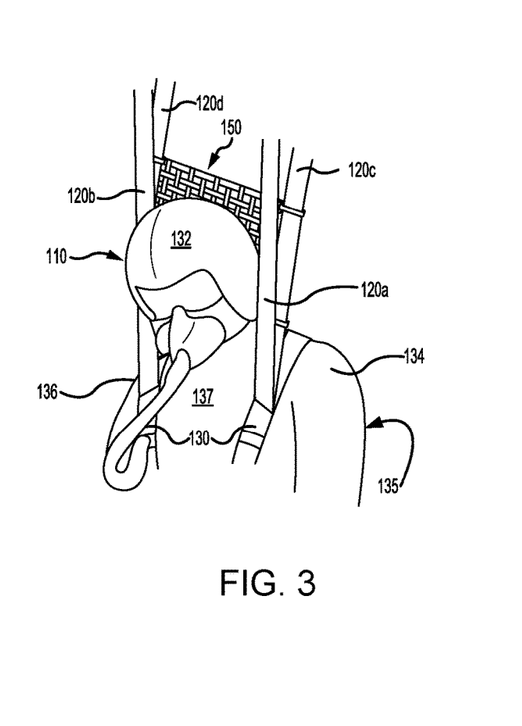
FIG. 3 illustrates a perspective view of a neck protection system of a parachute assembly in a deployed state, in accordance with various embodiments.

With reference to FIG. 3, in various embodiments, parachute assembly 116 may comprise left (or first) risers 120a and 120c, and right (or second) risers 120b and 120d. Left risers 120a and 120c are attached proximate a left shoulder 134 of occupant 110 and/or are configured to be located over left shoulder 134 of occupant 110 upon deployment of parachute assembly 116. Right risers 120b and 120d are attached proximate a right shoulder 136 of occupant 110 and/or are configured to be located over right shoulder 136 of occupant 110 upon deployment of parachute assembly 116. In various embodiments, left riser 120a is located forward of left riser 120c, and right riser 120b is located forward of right riser 120d. Stated differently, left riser 120c and right riser 120d may be located closer to a backside 135 of occupant 110 as compared, respectively, to left riser 120a and right riser 120b. As used herein, "forward" refers to the side of harness 130 configured to be attached to a front side of an occupant. Front side 137 of occupant 110 is generally opposite backside 135 of occupant 110. Harness 130 retains to occupant 110 and wraps along both the front side 137 and backside 135 of the occupant 110.

With combined reference to FIG. 2 and FIG. 3, in various embodiments, parachute assembly 116 may comprise a greater number of suspension lines 122 as compared to the number of risers 120. For example, each riser 120 may be couple to and/or formed by multiple suspension lines 122, such as, for example 1 to 16 suspension lines 122 per riser 120, 8 to 16 suspension lines 122 per riser 120, etc. In this regard, left riser 120a, right riser 120b, left riser 120c, and right riser 120d may each be coupled to its own individual set of suspension lines 122.

As canopy 126 catches wind, occupant 110 may be rotated in-line with the direction of suspension line stretch. As occupant 110 is rotated, a rearward force may be exerted on the neck of occupant 110. As used herein, "rearward" refers to the side of harness 130 configured to be attached to a backside of an occupant supported by parachute assembly 116. In accordance with various embodiments, parachute assembly 116 may include a neck protection system 150 (FIG. 3). Neck protection system 150 is configured to be located rearward of the head 132 of occupant 110. Neck protection system 150 is configured to limit translation of head 132 in the rearward direction, thereby reducing a likelihood of head and/or neck injury to occupant 110.

Figure 4A:
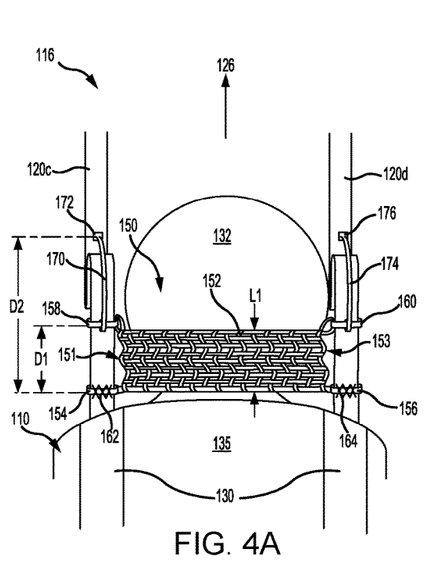
FIG. 4A illustrates a neck protection system in a stowed position, in accordance with various embodiments.

Referring to FIG. 4A, neck protection system 150 is illustrated in a stowed position. In accordance with various embodiments, neck protection system 150 includes a head restraint 152. Head restraint 152 may comprise netting, mesh, a solid member, or any other structure capable of restricting rearward movement of head 132. Head restraint 152 may comprise canvas, nylon webbing, aramid fiber (e.g., KEVLAR®), polyethylene terephthalate, and/or the like. In various embodiments, head restraint 152 comprises an elastic material.

Head restraint 152 may be coupled to left riser 120c and right riser 120d. In various embodiments, neck protection system 150 includes a left (or first) lower strap 154, a right (or second) lower strap 156, a left (or first) upper strap 158, a right (or second) upper strap 160. Left and right lower straps 154, 156 are located closer to harness 130 as compared to left and right upper straps 158, 160. Stated differently, a distance between left and right lower straps 154, 156 and harness 130 is less than the distance between left and right upper straps 158, 160 and harness 130. Stated yet another way, left and right upper straps 158, 160 are located closer to canopy 126 as compared to left and right lower straps 154, 156 and as measured along left riser 120c and right riser 120d. Left lower strap 154 and left upper strap 158 may be coupled to a left (or first) side 151 of head restraint 152. Left lower strap 154 and left upper strap 158 may couple head restraint 152 to left riser 120c. Right lower strap 156 and right upper strap 160 may be coupled to a right (or second) side 153 of head restraint 152. Right lower strap 156 and right upper strap 160 may couple head restraint 152 to right riser 120d. In various embodiments, left lower strap 154 and left upper strap 158 may each define a loop through which left riser 120c is located. Similarly, right lower strap 156 and right upper strap 160 may each form a loop through which right riser 120d is located.

In accordance with various embodiments, left lower strap 154 and right lower strap 156 may be releasably coupled, respectively, to left riser 120c and right riser 120d. In various embodiments, a releasable restraint 162 couples left lower strap 154 to left riser 120c. A releasable restraint 164 couples right lower strap 156 to right riser 120d. Releasable restraints 162, 164 may comprise a frangible thread, hook and loop fasteners (e.g., VELCRO®), snaps, or any other releasable restraint. Left upper strap 158 and right upper strap 160 may be configured to translate (e.g., slide), respectively, along left riser 120c and right riser 120d. In various embodiments, a (first) pull cord 170 is coupled between, and to, left upper strap 158 and an attachment point 172 on left riser 120c. A (second) pull cord 174 is coupled between, and to, right upper strap 160 and an attachment point 176 on right riser 120d.

In accordance with various embodiments, the length of pull cords 170, 174 and the location of attachment points 172, 176 are selected such that, when parachute assembly 116 is in the stowed state, there will be slack in left and right risers 120c, 120d. In this regard, when parachute assembly 116 is in the stowed state, neck protection system 150 is in a stowed position. In the stowed position, head restraint 152 may be located below head 132. In the stowed position, left and right lower straps 154, 156 may be located a distance D1 from left and right upper straps 158, 160, respectively. In the stowed position, left and right lower straps 154, 156 may be located a distance D2 from attachment points 172, 176, respectively. The distance D1 between left and right lower straps 154, 156 and left and right upper straps 158, 160 causes head restraint 152 to have a length L1, in the stowed position. The length L1 of head restraint 152 in the stowed position creates a smaller envelope and allows for easier packing of head restraint 152 between occupant 110 and ejection seat 106, with momentary reference to FIG. 1.

Figure 4B:
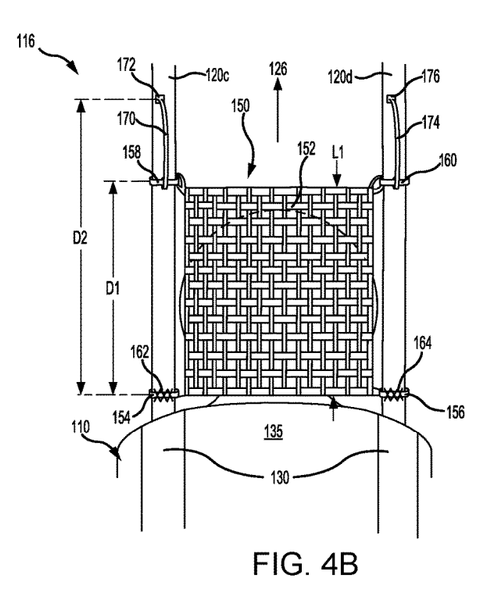
FIG. 4B illustrates a neck protection system in a deployed position, in accordance with various embodiments.

With reference to FIG. 4B, neck protection system 150 is illustrated in an initially deployed, or "extended", position. In accordance with various embodiments, during deployment of parachute assembly 116, attachment points 172, 176 translate away from left and right lower straps 154, 156, thereby increasing the distance D2 between left and right lower straps 154, 156 and attachment points 172, 176. The attachment of pull cords 170, 174 to attachment points 172, 176 causes pull cords 170, 174 to translate away from left and right lower straps 154, 156. The attachment of pull cords 170, 174 to left and right upper straps 158, 160 causes left and right upper straps 158, 160 to translate along left and right risers 120c, 120d and away from left and right lower straps 154, 156. During the initial deployment of head restraint 152, releasable restraints 162, 164 cause left and right lower straps 154, 156 to remain generally stationary, relative to left and right risers 120c, 120d. In this regard, translation of left and right upper straps 158, 160 away from left and right lower straps 154, 156 increases the distance D1 between left lower strap 154 and left upper strap 158 and between right lower strap 156 and right upper strap 160. The increase in distance D1 increases the length L1 of head restraint 152. In various embodiments, increasing length L1 increases a tautness of head restraint 152. The increase in distance D1 and in length L1 locates head restraint 152 generally behind head 132 such that head restraint 152 can limit rearward translation of head 132. Limiting rearward translation of head 132 tends to reduce a possibility of neck hyperextension during deployment of the parachute assembly 116.

Figure 4C:
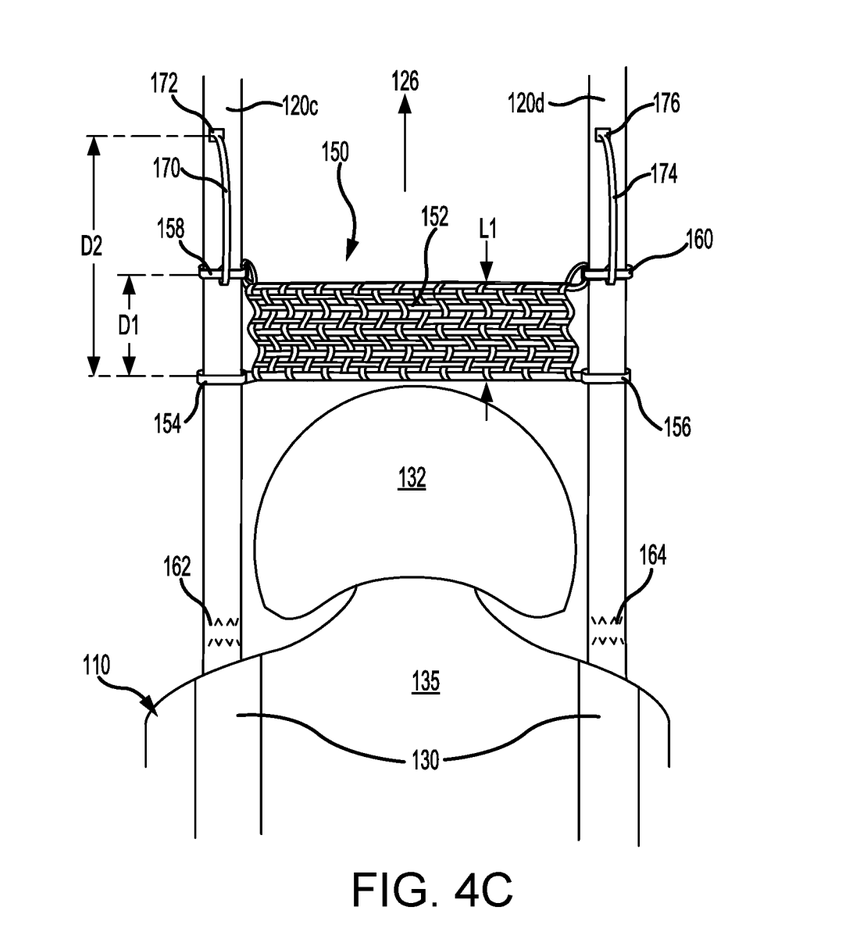
FIG. 4C illustrates a neck protection system in a release position, in accordance with various embodiments.

With reference to FIG. 4C, neck protection system 150 is illustrated in a released position. In accordance with various embodiments, after initial deployment of parachute assembly 116, for example, after canopy 126 has fully, or at least substantially, opened, occupant 110 may grasp head restraint 152 and translate head restraint 152 toward left and right upper straps 158, 160 to remove head restraint 152 from behind head 132.

The force applied by occupant 110 is configured decouple (i.e., release) releasable restraints 162, 164, thereby allowing left and right lower straps 154, 156 to translate, respectively, along left and right risers 120c, 120d and toward left and right upper straps 158, 160. For example, if releasable restraints 162, 164 comprise a frangible thread, the force applied by occupant 110 to head restraint 152 causes the frangible thread to break; if releasable restraints 162, 164 comprise a hook and loop fasteners, the force applied by occupant 110 separates the hooks from the loops, etc. Translating left and right lower straps 154, 156 toward left and right upper straps 158, 160 decreases distances D1, D2 and length L1 of head restraint 152. In various embodiments, head restraint 152 comprises an elastic material configured to translate to a neutral position in response to separation of releasable restraints 162, 164. The location of attachment points 172, 176 may be selected such that in the neutral position, head restraint 152 will be removed from behind head 132.

Having the head restraint 152 in place during steady state decent can be uncomfortable and can restrict a range of motion of head 132, which may limit the sight lines of occupant 110 and/or affect his/her ability to look for a clear landing area. Releasable restraints 162, 164 allowing occupant 110 to move head restraint 152 from behind head 132 tends to increase comfort and/or the range of motion of head 132.

Figure 5:
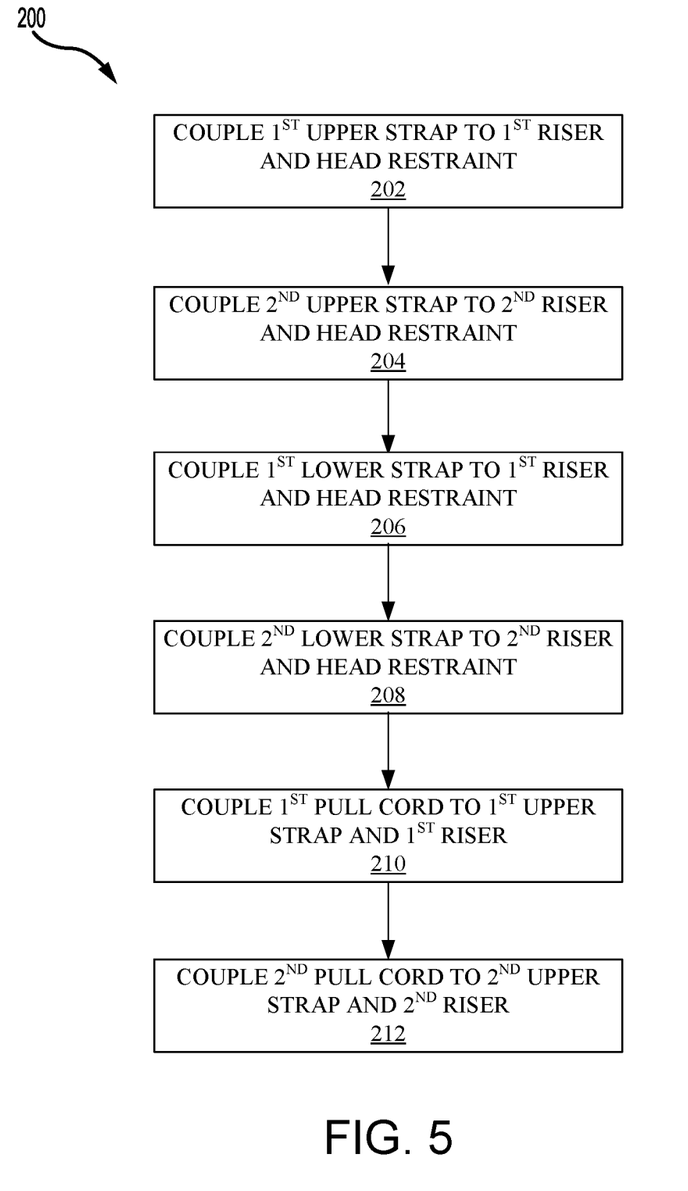
FIG. 5 illustrates a method of assembling an parachute assembly having a neck protection system, in accordance with various embodiments.

Referring to FIG. 5, a method 200 of assembling a parachute assembly is illustrated. In accordance with various embodiments, method 200 may comprise coupling a first upper strap to a first riser and a head restraint (step 202), coupling a second upper strap to a second riser and the head restraint (step 204), coupling a first lower strap to the first riser and the head restraint (step 206), and coupling a second lower strap to the second riser and the head restraint (step 208). Method 200 may further include coupling a first pull cord to the first upper strap and a first attachment point on the first riser (step 210). The first attachment point may be configured to translate away from the first lower strap in response to deployment of the parachute assembly. Method 200 may further include coupling a second pull cord to the second upper strap and a second attachment point on the second riser (step 212). The second attachment point may be configured to translate away from the second lower strap in response to deployment of the parachute assembly.

In various embodiments, step 206 may comprise attaching a first releasable restraint to the first lower strap and the first riser. Step 208 may comprise attaching a second releasable restraint to the second lower strap and the second riser.

With combined reference to FIG. 5 and FIG. 4A, method 200 may include assembling parachute assembly 116. In various embodiments, step 202 of method 200 may include coupling left upper strap 158 to left riser 120c and head restraint 152. Step 204 may include coupling right upper strap 160 to right riser 120d and head restraint 152. Step 206 may include coupling left lower strap 154 to the left riser 120c and head restraint 152. Step 208 may include coupling right lower strap 156 to right riser 120d and head restraint 152. Step 210 may include coupling pull cord 170 to left upper strap 158 and attachment point 172 on left riser 120c. In accordance with various embodiments, attachment point 172 is configured to translate away from left lower strap 154 and increase distance D2 in response to deployment of parachute assembly 116. Step 212 may include coupling pull cord 174 to right upper strap 160 and attachment point 176 on right riser 120d. In accordance with various embodiments, attachment point 176 is configured to translate away from right lower strap 156 and increase distance D2 in response to deployment of parachute assembly 116.

With continuing reference to FIG. 5 and FIG. 4A, in various embodiments, step 206 may comprise attaching releasable restraint 162 to left lower strap 154 and left riser 120c. Step 208 may comprise attaching releasable restraint 164 to right lower strap 156 and right riser 120d. In various embodiments, distance D1 between the left upper strap 158 and left lower strap 154 and between right upper strap 160 and right lower strap 156 increases to initially deploy head restraint 152 (i.e., to increase length L1 and locate head restraint 152 behind the occupant's head) in response to deployment of the parachute assembly 116. In various embodiments, the distance D1 between the left upper strap 158 and left lower strap 154 and between right upper strap 160 and right lower strap 156 decreases after the initial deployment of head restraint 152 and in response to separation of releasable restraints 162, 164.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A neck protection system for a parachute assembly, the neck protection system, comprising:
   a head restraint;
   a first upper strap coupled to a first side of the head restraint;
   a second upper strap coupled to a second side of the head restraint, the second side being opposite the first side;
   a first lower strap coupled to the first side of the head restraint;
   a second lower strap coupled to the second side of the head restraint;
   a first pull cord coupled to the first upper strap;
   a second pull cord coupled to the second upper strap
   a first releasable restraint coupled to the first lower strap; and
   a second releasable restraint coupled to the second lower strap, wherein the head restraint comprises an elastic material configured to translate to a neutral position in response to decoupling of the first releasable restraint and the second releasable restraint.

2. The neck protection system of claim 1, wherein the first releasable restraint comprises at least one of a first frangible thread, a plurality of first hook and loop fasteners, or a first snap; and wherein the second releasable restraint comprises at least one of a second frangible thread, a plurality of second hook and loop fasteners, or a second snap.

3. The neck protection system of claim 1, wherein the first lower strap, the first upper strap, the second lower strap, and the second upper strap each form a loop configured to receive a riser of the parachute assembly.

4. The neck protection system of claim 3, wherein the head restraint comprises at least one of a net or a mesh.

5. The neck protection system of claim 3, wherein a distance between the first upper strap and the first lower strap is configured to increase in response to deployment of the parachute assembly.

6. The neck protection system of claim 5, wherein the distance between the first upper strap and the first lower strap is configured to decrease in response to the decoupling of the first releasable restraint.

7. A parachute assembly, comprising:
   a first riser;
   a second riser; and
   a neck protection system coupled to the first riser and the second riser, the neck protection system including:
      a head restraint;
      a first upper strap coupled to the head restraint and the first riser;
      a second upper strap coupled to the head restraint and the second riser;
      a first lower strap coupled to the head restraint and the first riser;
      a second lower strap coupled to the head restraint and the second riser;
      a first pull cord coupled to the first upper strap and the first riser;
      a second pull cord coupled to the second upper strap and the second riser,
      a first releasable restraint coupled to the first lower strap and the first riser; and
      a second releasable restraint coupled to the second lower strap and the second riser, wherein a first distance between the first upper strap and the first lower strap and a second distance between the second upper strap and the second lower strap are each configured to increase in response to deployment of the parachute assembly, and wherein the first distance and the second distance each decrease in response to a decoupling of the first releasable restraint and the second releasable restraint.

8. The parachute assembly of claim 7, further comprising a canopy coupled to the first riser and the second riser, wherein the first upper strap is located closer to the canopy as compared to the first lower strap.

9. The parachute assembly of claim 8, wherein the first riser is located through the first lower strap and the first upper strap, and wherein the second riser is located through the second lower strap and the second upper strap.

10. The parachute assembly of claim 7, wherein the head restraint comprises an elastic material.

11. The parachute assembly of claim 10, wherein the elastic material is configured to return to a neutral position in response to the decoupling of the first releasable restraint and the second releasable restraint.

12. The parachute assembly of claim 11, wherein the first releasable restraint comprises at least one of a frangible thread or hook and loop fasteners.

13. The parachute assembly of claim 11, wherein the first pull cord is coupled to the first upper strap and a first attachment point on the first riser, and wherein the first attachment point is configured to translate away from the first lower strap in response to deployment of the parachute assembly.

14. The parachute assembly of claim 13, wherein the second pull cord is coupled to the second upper strap and a second attachment point on the second riser, and wherein the second attachment point is configured to translate away from the second lower strap in response to deployment of the parachute assembly.

15. A method of assembling a parachute assembly, comprising:
   coupling a first upper strap to a first riser and a head restraint;
   coupling a second upper strap to a second riser and the head restraint;
   coupling a first lower strap to the first riser and the head restraint;
   coupling a second lower strap to the second riser and the head restraint;
   coupling a first pull cord to the first upper strap and a first attachment point on the first riser, wherein the first attachment point is configured to translate away from the first lower strap in response to deployment of the parachute assembly;
   coupling a second pull cord to the second upper strap and a second attachment point on the second riser, wherein the second attachment point is configured to translate away from the second lower strap in response to deployment of the parachute assembly;
   attaching a first releasable restraint to the first lower strap and the first riser; and attaching a second releasable restraint to the second lower strap and the second riser, wherein the head restraint comprises an elastic material configured to translate to a neutral position in response to decoupling of the first releasable restraint and the second releasable restraint.

\* \* \* \* \*